Aug. 28, 1928.

E. W. BREISCH ET AL 1,682,476

LIGHTNING ARRESTER

Filed April 18, 1922

WITNESSES:
C. N. Cochran
W. B. Jaspert

INVENTORS
Edgar W. Breisch &
Frank B. Falknor
BY
ATTORNEY

Patented Aug. 28, 1928.

1,682,476

UNITED STATES PATENT OFFICE.

EDGAR W. BREISCH, OF EDGEWOOD, AND FRANK B. FALKNOR, OF WILKINSBURG, PENNSYLVANIA, ASSIGNORS TO WESTINGHOUSE ELECTRIC & MANUFACTURING COMPANY, A CORPORATION OF PENNSYLVANIA.

LIGHTNING ARRESTER.

Application filed April 18, 1922. Serial No. 555,325.

Our invention relates to lightning arresters, more especially to lightning arresters of the spark-gap type embodying spherical or hemispherical electrodes mounted on horn-gaps which are commonly employed in power-transmission circuits.

It is among the objects of our invention to provide lightning arresters of the above-designated type in which the electrodes shall be of a special design and composed of such materials that they will function efficiently over a wide range of atmospheric and weather conditions.

It is another object of our invention to provide an arrangement of spark-gap lightning arresters that shall function to break down at more uniform voltages than was hitherto the case.

Sphere-gap lightning arresters are well known for use as protective means for electrical-transmission circuits and they have been employed in various forms and sizes, such as spheres and hemispheres of both large and small diameters used in conjunction with horns for diverting and rupturing arcs formed between the spherical surfaces.

It has been found that such sphere gaps are inefficient when subjected to rain or damp atmospheric conditions due to globules of water forming on the sphere surfaces either by condensation or direct contact with rain or other precipitation. This inefficiency is caused by the gap functioning as a point gap instead of a sphere gap as the spark has a tendency to arc across the points formed by the globules on the comparatively smooth surfaces of the spheres.

In our present invention, we propose to provide spherical spark gaps having porous surfaces designed to prevent the formation of globules by absorbing and distributing the moisture thereon.

Figure 1:
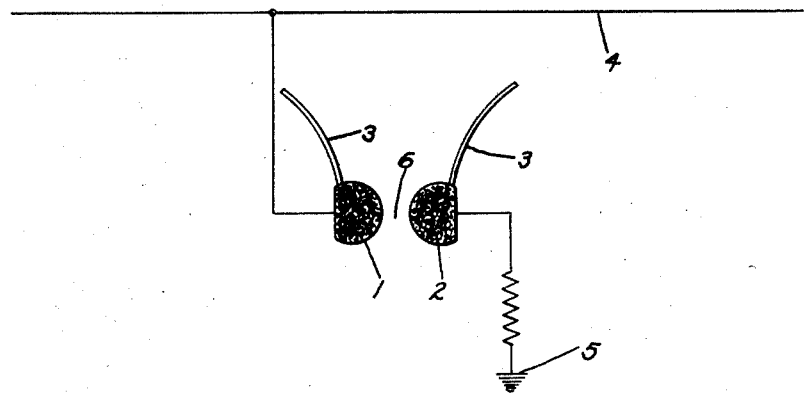
Figure 2:
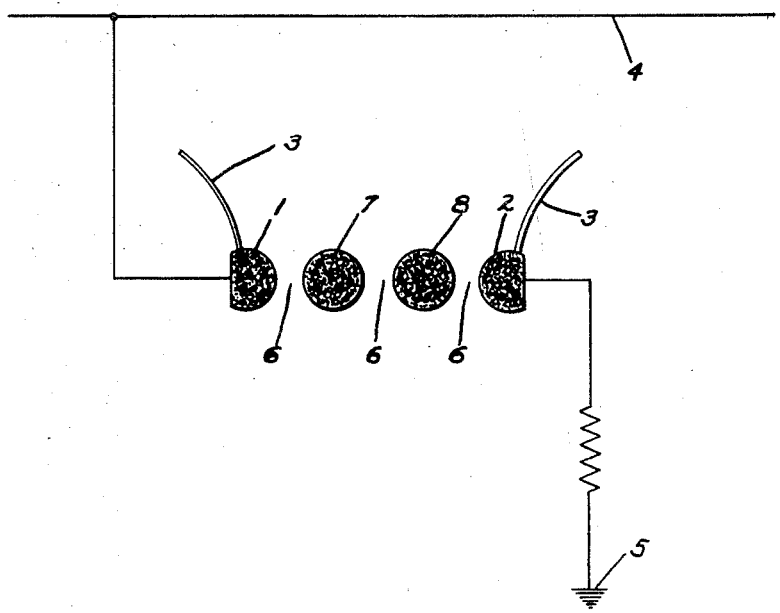

In the accompanying drawing, constituting a part hereof and in which like reference characters designate like parts, Figure 1 is a diagrammatic view of a sphere-gap lightning arrester representing one embodiment of our invention; and Fig. 2 is a diagrammatic view of a modified form of lightning arrester.

Referring to Fig. 1, the numerals 1 and 2 represent a pair of substantially hemispherical electrodes having metallic horns 3 projecting therefrom, the electrodes being connected between a line 4 and ground 5 of a power-transmission circuit and having a gap 6 therebetween. The members 1 and 2 are of the usual shape but consist of a porous cement body, such as Portland cement, compounded with a conducting medium, such as granulated carbon, granulated carborundum, or metallic granules. In place of the Portland cement, we may utilize porous porcelain containing any of the above conducting mediums or porous porcelain containing a deposit of metallic copper or silver, or other conductive material electrolytically deposited in the pores of the structure.

Instead of these compounds, the electrodes may consist entirely of porous spheres or hemispheres of carbon or any suitable conducting material having outer surfaces of relatively high porosity.

In the Fig. 2 is shown a pair of spheres 7 and 8 mounted between a pair of hemispherical electrodes 1 and 2 to further guard against breakdown of the air gaps 6 due to point gaps caused by the formation of projecting globules of water. The object of the plurality of spheres and hemispheres is to provide a greater number of gaps 6 which operate on the assumption that globules of water will not collect on all the surfaces at one time, thereby giving the arrester a fixed average discharge capacity.

The device illustrated in Fig. 1 functions briefly as follows. When the voltage on the line 4 becomes abnormal, owing to a sudden surge, such as is caused by lightning, a discharge will flow across the gap 6. It was found by experiment that, if the electrodes 1 and 2 of porous composition are wet, the discharge capacity of the gap is approximately 90% of its normal dry rating, whereas when metal electrodes are employed, the difference between the discharge capacity of the wet and dry surfaces is very great. This is due to the absorbent character of the porous material which either absorbs the moisture forming on the slightly roughened surface, or, as in the event of a short rain, the water is so distributed over the surface as to prevent the accumulation of globules. The device shown in Fig. 2 functions in a similar manner.

It will be readily understood from the above description of our invention that lightning arresters formed in accordance therewith provide a simple and efficient protective device which is inexpensive and can be uniformly produced in large quantities. Another advantage is the greater reliability of such a device under adverse operating conditions.

Although we have described two specific embodiments of our invention, various modifications may be made in the details of construction thereof. For instance, the sphere and hemisphere structures may be formed of any suitable material that provides porous working surfaces and body portions of a suitable conducting capacity. The use of the porous bodies is not limited to the structures shown but the same may be employed in any electrical circuit where it is desired to provide a gap between a pair of electrodes. The bodies need not be spherical since other forms of electrodes may be used. These and other changes may be made in the details of construction of our invention without departing from the principles herein set forth.

We claim as our invention:

1. An outdoor lightning arrester adapted to be substantially unaffected by exposure to the weather and comprising a plurality of exposed spherical electrodes of porous porcelain compounded with carbonaceous material.

2. An outdoor lightning arrester adapted to be substantially unaffected by exposure to the weather and comprising two spaced rounded spark-gap electrodes exposed to moisture from bad weather, at least one of said electrodes being of a material which is conductive when dry and which is capable of preventing the formation of globules of water on the surface thereof when wet.

3. An outdoor lightning arrester adapted to be substantially unaffected by exposure to the weather and comprising two spaced rounded spark-gap electrodes exposed to moisture from bad weather, at least one of said electrodes being of a material which is conductive when dry and which is sufficiently porous to absorb and distribute any moisture which is precipitated on the surface thereof.

4. An outdoor lightning arrester adapted to be substantially unaffected by exposure to the weather and comprising two spaced rounded spark-gap electrodes exposed to moisture from bad weather, at least one of said electrodes being of a porous insulating binding material having granulated conducting material distributed therein, said granulated material being conductive even when it is quite dry.

In testimony whereof, we have hereunto subscribed our names this 13th day of April, 1922.

EDGAR W. BREISCH.
FRANK B. FALKNOR.